Patented Oct. 21, 1941

2,259,726

UNITED STATES PATENT OFFICE 2,259,726

METHOD OF PRODUCING REFINED, NON-CRYSTALLIZABLE ROSIN

Joseph N. Borglin, Wilmington, Del., assignor to Hercules Powder Company, Wilmington, Del., a corporation of Delaware No Drawing. Application November 16, 1939, Serial No. 304,695

10 Claims. (Cl. 260—107)

This invention relates to a method of producing a refined, non-crystallizable rosin and more particularly to a method of producing a refined, non-crystallizable rosin from rosin having a tendency to crystallize in the crude or refined state.

Rosin or rosin acids, and particularly wood rosin, has been refined by treatment with refining agents which remove the visible and latent color bodies. Refining agents, in general, also remove a portion of the non-crystallizing components of the rosin. As a result, the refined rosin exhibits a far greater tendency to crystallize than does the original rosin. This tendency of refined rosins to crystallize is a serious disadvantage in many of the commercial applications of refined rosins and detracts considerably from the utilization of such rosins. Methods have been described for reducing the tendency of refined rosins to crystallize, such as subjecting the rosin to a heat treatment to effect isomerization to non-crystallizing rosin acids. Such methods are usually not very satisfactory because high temperatures are required and considerable decomposition occurs. A non-crystallizing refined rosin is a very desired product.

It is an object of this invention to provide a method of producing a refined non-crystallizable rosin.

It is a further object to provide a method of producing a refined, non-crystallizable rosin from unrefined rosin having a tendency to crystallize either in the crude or refined state.

Other objects of the invention will appear hereinafter.

Now, in accordance with this invention, I have found that by first removing the crystallizing portion of wood or gum rosin by any suitable means, and then refining the non-crystalline residue by treatment with a selective absorbent for the color bodies present in the rosin, I may produce a refined rosin which is non-crystalline and which shows no tendency to crystallize. The refining step of my process is carried out by subjecting the non-crystalline rosin residue resulting after removal of the crystallizing portion in solution in an organic solvent to treatment with an absorbent having a preferential affinity for color bodies contained in the rosin and which is capable of immiscibility with the rosin solution. The rosin solution is separated from the absorbent and the refined non-crystallizable rosin recovered from the rosin solution.

In carrying out the first step of my process, the rosin having a tendency to crystallize either in the crude or refined state may be treated to remove the crystallizing portion, for example, by dissolving the rosin in a solvent in which the crystallizable portion of the rosin is insoluble at ordinary temperatures and removing the crystallizing portion which separates from the solution. Similarly, the crystallizing portion may be separated by treating the rosin with alkali in amount to combine with sufficient of the crystallizing portion of the rosin to form an acid salt of the rosin acid and leave a non-crystallizable residue. The crystalline rosin acid salt may then be removed.

In removing the crystallizing portion of the rosin by crystallization from a suitable solvent, I have found that dilute ethyl alcohol, for example of a concentration of about 88%, is satisfactory. Desirably a solvent diluted with water will be used, since it has been found that a dilute aqueous solvent will enable a more complete separation of the crystallizing portion. Water-immiscible solvents may also be used, since many such solvents are equally effective. As illustrative, in addition to ethyl alcohol, I may use, for example, methyl alcohol, acetone or other water-miscible rosin solvent, or I may use a hydrocarbon, as for example, gasoline, petroleum naphtha, benzene, toluene or the like, or pine oil, turpentine, etc. Where a water-immiscible solvent is used, it will be desirable, though not essential, to admix or emulsify with the solvent a small quantity of water, for example, from 2 to 10%. The presence of water in the solvent, whether as a diluent where a water-miscible solvent is used, or admixed or emulsified, as where a water-immiscible solvent is used, will largely facilitate the crystallization of the crystallizing portion of the rosin.

In removing the crystallizing portion of the rosin by precipitation of the acid salt of the rosin acid by addition of alkali, I have found that an alkali, as for example, caustic soda, caustic potash, soda ash, potassium carbonate, etc., may be used. The rosin is desirably in solution in a solvent as, for example, methyl alcohol, ethyl alcohol, acetone, ether, gasoline, etc. Acetone is particularly suitable and a small amount of water, about 2%, is also desirable. In the case of FF wood rosin, it is desirable to add sufficient alkali to combine with about 25% of the abietic acid present with formation of so-called 3:1 salt, which is sodium tetrabietate. The rosin contained in the mother liquor resulting after removal of the crystallized salt is non-crystallizable. The mother liquor will usually contain combined alkali, which may be effectively removed by treating the solution with carbon dioxide. The alkali carbonate or bicarbonate thus formed dissolves in the water present in the solvent and is removed therewith. Neutralization of the combined alkali in the mother liquor by addition of acids is not satisfactory since acids tend to isomerize the rosin to crystalline forms. The non-crystallizable rosin may be recovered from the solution, for example, by washing the solution and evaporating the solvent.

In the second step of my process, the rosin residue resulting from the above treatment is subjected to a refining treatment to remove the color bodies and to produce the refined non-crystallizable rosin, the product of the invention. Generally speaking, the rosin residue resulting from the first step of my process is darker in color than the original rosin. For the second step of my process, the rosin residue is dissolved in an organic solvent for the rosin which is chemically non-reactive with the selective color-body absorbent employed and which is capable of immisibility with the latter at ordinary temperatures. The concentration of the rosin residue in such a solution may be within the range of about 15% to about 30% by weight, and desirably within the range of about 15% to about 30% by weight.

The selective color-body absorbent which I may use may be either a liquid selective solvent or may be a solid absorbent. The term "absorbent" as used herein and in the claims thus includes both absorbing as by a solid and dissolving and retaining as by a liquid, thus removing color bodies from the rosin solution in which they are dissolved. As a liquid selective color-body solvent any of the various selective solvents for the visible and latent color bodies of rosins heretofore known may be used. Thus, I may use furfural, furfuryl alcohol, a chlorohydrin, as, ethylene chlorohydrin, propylene chlorohydrin, etc., aniline, phenol, resorcinol, ethylene glycol, propylene glycol, butylene glycol, diethylene glycol, trimethylene glycol, glycerol, butyl glycerol, ethyl formate, methyl acetate, methyl formate, methyl orthonitrobenzoate, methyl furoate, an alkyl formate, monoacetin, diacetin, triacetin, ethylene glycol monoacetate, methanol, an hydroxyl alkyl amine, as triethanolamine, a solution of oxalic acid in water or in methanol, ethanol or other lower aliphatic alcohol, ethylene glycol monoethyl ether, or other immiscible glycol ether, ethylene glycol, monoacetate, or other immiscible glycol ester, methyl thiocyanate, ethyl thiocyanate, acetonitrile, acetic acid, acetic anhydride, p-chloraniline, resorcinol plus hydrosulphite, ethylene glycol diacetate, glycerol diacetate, resorcinol monoacetate, resorcinol diacetate, phenyl acetate, furfuryl acetate, ethylidine diacetate, n-propyl furoate, ethyl glycollate, methyl citrate, ethyl tartrate, ethyl malonate, methyl maleate, dimethyl phthalate, benzyl formate, monobutyrin, ethyl carbonate, methyl lactate, diethyl oxalate, methyl adipate, hydroxyhydroquinone triacetate, methyl chlorocarbonate, propylene glycol monoacetate, hydroquinone diacetate, catechol monoacetate, guaiacyl acetate, methyl glutarate, ethyl oxalate, benzyl acetate, diethyl glutacoate, ethyl lactate, diethyl phthalate, ethyl anisate, methyl salicylate, methyl cinnamate, methyl mandelate, methyl acrylate, ethyl oxamate, methyl succinate, ethyl propiolate, ethyl malate, methoxybenzaldehyde, guaiacol, anisidin, nitroanisol, dichloroethyl ether, methoxy acetic acid, methyoxybenzyl alcohol, liquid sulfur dioxide, nitromethane, nitrobutanol, etc., or mixtures of such refining agents which are chemically non-reactive, etc. As solid absorbents activated carbon, activated alumina, absorbent earths such as fuller's earth, absorbent clay or activated absorbent earths such as acid treated fuller's earth, or their equivalents, may be used.

The temperature at which the refining step may be carried out is dependent upon the selective color-body absorbent employed and will be within the range of about −10° C. to about +60° C. The rosin solution and the selective absorbent may be heated to effect miscibility of the solutions in the case of a selective solvent or may merely be agitated. The rosin solution is separated after the treatment and the refined non-crystallizable rosin recovered by evaporation of the rosin solvent, preferably under reduced pressure.

As illustrative of the practical adaptation of the process in accordance with my invention, I may cite the following:

*Example I*

Six hundred parts by weight of FF wood rosin were dissolved in 900 parts by weight of acetone. To this solution a solution of 7.5 parts by weight of caustic soda in 60 parts by weight of water was added, the temperature of the solution being maintained at about 56° C. The resulting solution was cooled and a few crystals of 3:1 rosin salt (sodium tetrabietate) were added to hasten precipitation of the 3:1 rosin salt from the solution. When precipitation was complete the salt was removed by filtration, washed with acetone, then dried. The yield of 3:1 salt obtained was 114 parts by weight. The mother liquor rosin solution contained approximately 1% of combined caustic. It was diluted with 400 parts by weight of water and 300 parts by weight of toluene and treated with carbon dioxide by blowing the gas through the solution. After the combined caustic had been converted to sodium carbonate or bicarbonate, the toluene solution was decanted, washed with water and evaporated. The resulting rosin had a specific rotation of +21.6° and was non-crystallizable as determined by a core oil test. The original FF wood rosin had a specific rotation of 8.9° and crystallized in the core oil test. Seventy-five parts by weight of the recovered non-crystallizable rosin were dissolved in 200 parts by weight of gasoline and the resulting solution subjected to one wash with 17.5 parts by weight of furfural and 9 washes with 5.8 parts by weight of furfural at room temperature. After separation of the furfural solution the gasoline solution of the rosin was evaporated under reduced pressure to separate the refined non-crystallizable rosin. The latter was obtained in the yield of 48 parts by weight and graded K in color. It had a specific rotation of +14.7° and was non-crystallizable in the core oil test.

*Example II*

Five hundred parts by weight of FF wood rosin were dissolved in 500 parts by weight of 85% ethyl alcohol by heating to form solution. This solution was cooled to room temperature, a few crystals of abietic acid added and the solution allowed to stand for about 15 hours to permit crystallization of the abietic acid. On filtering, 200 parts by weight of crude crystalline abietic acid were separated. The mother liquor rosin solution was evaporated to remove the alcohol. Two hundred parts by weight of the non-crystalline rosin, grading E in color, recovered from the alcoholic solution were dissolved in 600 parts by weight of gasoline. The gasoline solution was subjected to one wash with 106 parts by weight of 85% phenol and four washes with 74 parts by weight of 85% phenol at room temperature. After separation of the phenol solution, the gasoline solution of the rosin was evaporated under reduced pressure to separate the refined non-crystallizable rosin. A yield of 120 parts by weight of non-crystallizable rosin grading I in color was obtained.

*Example III*

Six hundred parts by weight of F gum rosin were dissolved in 710 parts by weight of acetone. While maintaining this solution at a temperature of about 60° C., a solution of 7.5 parts by weight of caustic soda in 60 parts by weight of water was added. The resulting solution was cooled and a few crystals of 3:1 rosin salt were added to hasten precipitation of the 3:1 rosin salt from the solution. When precipitation was complete the salt was removed by filtration, washed with acetone, then dried. A yield of 80 parts by weight of 3:1 salt was obtained. The mother liquor rosin solution was diluted with 500 parts by weight of water and 260 parts by weight of toluene and the resulting heterogeneous solution treated with carbon dioxide by blowing the gas through the solution. After the combined caustic had been converted to sodium carbonate or bicarbonate, the toluene solution was washed with water and the resulting solution evaporated to remove the toluene. Fifty parts by weight of the non-crystallizable rosin obtained, grading D in color, were dissolved in 200 parts by weight of gasoline and the resulting solution subjected to one wash with 46 parts by weight of furfural and six washes with 29 parts by weight of furfural at room temperature. After separation of the furfural, the gasoline solution of rosin was evaporated under reduced pressure to separate the refined non-crystallizable rosin. A yield of 31 parts by weight of refined, non-crystallizable rosin grading K in color was obtained.

It will be understood that the details and examples hereinbefore set forth are illustrative only, and that the invention as broadly described and claimed is in no way limited thereby.

What I claim and desire to protect by Letters Patent is:

1. The method of producing a refined, non-crystallizable rosin which comprises the steps of treating a rosin characterized by possessing crystallizing tendencies and by containing color bodies and a non-crystallizing portion so as to substantially remove the crystallizing portion from the rosin, then refining the non-crystalline rosin residue containing visible and latent color bodies by subjecting the residue in solution in an organic solvent to treatment with a selective color-body absorbent having a preferential affinity for the visible and latent color bodies and which is capable of immiscibility with the rosin solution, and recovering a refined non-crystallizable rosin from the rosin solution.

2. The method of producing a refined, non-crystallizable rosin which comprises the steps of dissolving a rosin characterized by possessing crystallizing tendencies and by containing color bodies and a non-crystallizing portion in a solvent in which the crystallizing portion of the rosin is insoluble at low temperatures, separating the crystallized rosin from the non-crystalline rosin residue, then refining the non-crystalline rosin residue containing visible and latent color bodies by subjecting the residue in solution in an organic solvent to treatment with a selective color-body absorbent having a preferential affinity for the visible and latent color bodies and which is capable of immiscibility with the rosin solution, and recovering a refined non-crystallizable rosin from the rosin solution.

3. The method of producing a refined, non-crystallizable rosin which comprises the steps of treating a rosin characterized by possessing crystallizing tendencies and by containing color bodies and a non-crystallizing portion with alkali in amount sufficient to form an acid salt of the crystallizing portion of the rosin, separating the crystalline rosin acid salt from the non-crystalline residue, then refining the non-crystalline rosin residue containing visible and latent color bodies by subjecting the residue in solution in an organic solvent to treatment with a selective color-body absorbent having a preferential affinity for the visible and latent color bodies and which is capable of immiscibility with the rosin solution, and recovering a refined non-crystallizable rosin from the rosin solution.

4. The method of producing a refined, non-crystallizable wood rosin which comprises the steps of treating a wood rosin characterized by possessing crystallizing tendencies and by containing color bodies and a non-crystallizing portion so as to substantially remove the crystallizing portion from the rosin, then refining the non-crystalline rosin residue containing visible and latent color bodies by subjecting the residue in solution in an organic solvent to treatment with a selective color-body absorbent having a preferential affinity for the visible and latent color bodies and which is capable of immiscibility with the rosin solution, and recovering a refined non-crystallizable rosin from the rosin solution.

5. The method of producing a refined, non-crystallizable gum rosin which comprises the steps of treating a gum rosin characterized by possessing crystallizing tendencies and by containing color bodies and a non-crystallizing portion so as to substantially remove the crystallizing portion from the rosin, then refining the non-crystalline rosin residue containing visible and latent color bodies by subjecting the residue in solution in an organic solvent to treatment with a selective color-body absorbent having a preferential affinity for the visible and latent color bodies and which is capable of immiscibility with the rosin solution, and recovering a refined non-crystallizable rosin from the rosin solution.

6. The method of producing a refined, non-crystallizable rosin which comprises the steps of treating a rosin characterized by possessing crystallizing tendencies and by containing color bodies and a non-crystallizing portion so as to substantially remove the crystallizing portion from the rosin, then refining the non-crystalline rosin residue containing visible and latent color bodies by subjecting the residue in solution in gasoline to treatment with a selective color-body absorbent having a preferential affinity for the visible and latent color bodies and which is capable of immiscibility with the rosin solution, and recovering a refined non-crystallizable rosin from the rosin solution.

7. The method of producing a refined, non-crystallizable rosin which comprises the steps of treating a rosin characterized by possessing crystallizing tendencies and by containing color bodies and a non-crystallizing portion so as to substantially remove the crystallizing portion from the rosin, then refining the non-crystalline rosin residue containing visible and latent color bodies by subjecting the residue in solution in an organic solvent to treatment with a selective color-body solvent having a preferential affinity for the visible and latent color bodies and which is capable of immiscibility with the rosin solution, and recovering a refined, non-crystallizable rosin from the rosin solution.

8. The method of producing a refined, non-crystallizable rosin which comprises the steps of treating a rosin characterized by possessing crystallizing tendencies and by containing color bodies and a non-crystallizing portion so as to substantially remove the crystallizing portion from the rosin, then refining the non-crystalline rosin residue containing visible and latent color bodies by subjecting the residue in solution in gasoline to treatment with furfural, and recovering a refined, non-crystallizable rosin from the rosin solution.

9. The method of producing a refined, non-crystallizable rosin which comprises the steps of treating a rosin characterized by possessing crystallizing tendencies and by containing color bodies and a non-crystallizing portion so as to substantially remove the crystallizing portion from the rosin, then refining the non-crystalline rosin residue containing visible and latent color bodies by subjecting the residue in solution in gasoline to treatment with phenol, and recovering a refined, non-crystallizable rosin from the rosin solution.

10. The method of producing a refined, non-crystallizable rosin which comprises the steps of treating a rosin characterized by possessing crystallizing tendencies and by containing color bodies and a non-crystallizing portion so as to substantially remove the crystallizing portion from the rosin, then refining the non-crystalline rosin residue containing visible and latent color bodies by subjecting the residue in solution in gasoline to treatment with aniline, and recovering a refined, non-crystallizable rosin from the rosin solution.

JOSEPH N. BORGLIN.